UNITED STATES PATENT OFFICE.

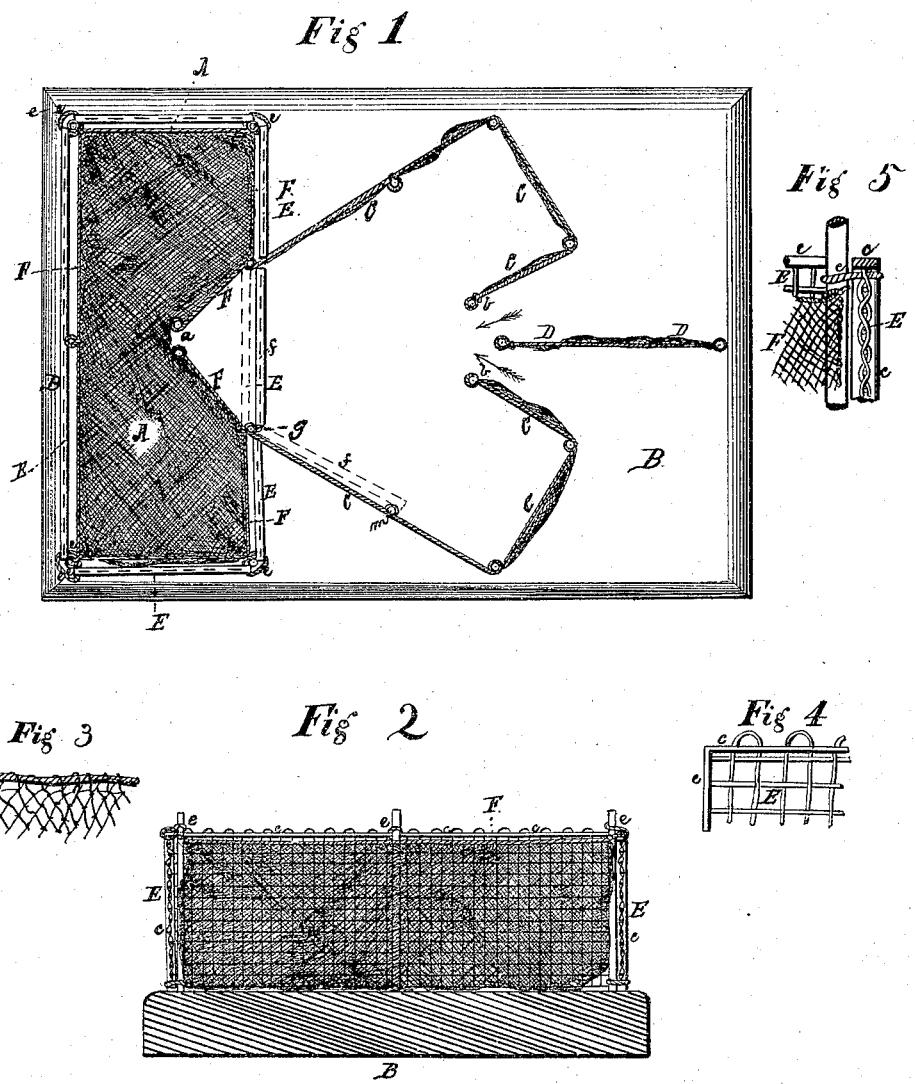

CHARLES E. KETCHAM, OF WASHINGTON, DISTRICT OF COLUMBIA.

IMPROVEMENT IN FISH-TRAPS.

Specification forming part of Letters Patent No. 137,930, dated April 15, 1873; application filed February 25, 1873.

*To all whom it may concern:*

Be it known that I, CHARLES E. KETCHAM, of Washington, in the county of Washington and District of Columbia, have invented certain Improvements in Fish-Traps, of which the following is a specification, reference being had to the accompanying drawing, in which—

Figure 1 represents a plan of a fish-trap having my improvements applied thereto, and Fig. 2 a vertical transverse section of the same looking toward the rear of the trap. Fig. 3 represents an enlarged view of a detached piece of the inner net, and Fig. 4 a similar view of the outer or wire net used by me for the protection of the inner one. Fig. 5 represents an enlarged sectional view in a vertical plane of a detached part of the trap to illustrate the arrangement of the two nets.

Fish-traps constructed on the plan illustrated in the drawing have heretofore been made with but a single net wherewith to inclose and secure the fish entrapped. In the use of a trap so constructed the fishermen experience great trouble from predaceous fish, such as sharks, dog-fish, &c., in their attempts to seize the fish inclosed in the trap; it being a matter of frequent occurence to have the net of the trap torn and bitten through by them in many places, through which the remainder of the captured fish escape; this being more particularly the case where the fish have to be retained in the trap for a few days in order to keep them alive until they can be transported to market, especially where fish with small and elongated heads become gilled in the meshes of the net, which tempts the fish that prey upon them as with a bait, (when otherwise they might not attack them in the net,) they cutting the net with their teeth in the attempt to seize the whole fish; this being especially true when it happens to be gilled near any of the angles of the trap. My improvement consists in combining with the trap proper, as formerly constructed, an outside metallic net or wire-screen, as a protection to the inner net, it being so arranged around the latter that the two shall be only a short distance apart from each other.

To enable others skilled in the art to make and use my invention, I will now proceed to describe it in detail, omitting a particular description of such parts of the trap as are old and in common use.

In Fig. 1 of the drawing the trap A is represented as being of the usual form and construction, and is arranged in the same way— that is to say, in the deep water of the channel of the river, with its mouth $a$ facing the bank or shore, and near which it must be located. B is simply a block of wood to which the trap is secured, and in no way forms part of the trap; it being merely used as a substitute to represent the bed of the stream or sea bottom; the trap being staked to the latter in the same way as it is to the block B in the drawing, when in use. C C represent the wings or heart-shaped entrance to the trap, and D the usual guide-net, and which is ordinarily made to extend from near the shore, and at right angles thereto to a point between the return ends $b$ of these wings. At the apex or forward end of the heart-shaped inclosure is arranged the mouth $a$ of the pound A or trap proper. This pound is made in the usual manner, and differs only from other traps of this class in having an outer protecting-screen E in addition to the usual net F that forms the wall of the pound or trap. This screen E is made in sections of galvanized iron or copper wire interlaced to form a strong netting, such as that shown in Fig. 4, the borders $c$ being formed of stout wires or rods to give it rigidity. If desired, stout wires may be woven through it at intervals apart to give it greater rigidity and strength in order to resist the onset of the larger predaceous fishes. The sections are attached on the outside of the frame-posts of the net, in any suitable manner, by means of strong wire or cord loops or links, $e$, both at their upper and lower edges; or they may be merely attached at the top, their gravity keeping them in place when attached in that way. The whole pound A is permanently surrounded by this wire-netting with the exception of the mouth $a$, which is provided with a wire net-gate, $f$, hinged to one, $g$, of the corner-posts which form the beginning of the inlet to the mouth of the pound A. This gate may be suspended on regular galvanized-iron hinges on post $g$, in which event the post $g'$ on the opposite side may be provided with a slotted catch into which a spring-catch secured to the gate $f$ may take, in order to keep it shut whenever desired, or by a simple cord loop or wire link; or the gate may be hung on loop-hinges so as to allow it to be drawn slightly back, and afterward pushed behind posts $g$ and $g'$, there to be held in place between the latter and the angled parts of the net of the trap which form the inlet to the mouth of the pound.

It is deemed better, for the purposes of transportation and of putting it up, to make the protecting wire-screen in sections, instead of being made in one piece or web, although it may be so made if desired. If a greater distance apart between the regular pound net and the protecting wire-net is desired, a separate row of stakes may be driven to which to secure it; but care must be taken in doing that not to make the distance so great as to interfere with the convenient management of the boat in removing the fish from the pound or trap, and which as a rule is done from the outside.

The operation is simple: When the trap is set to capture the fish the gate $f$ is swung open, as shown in dotted lines, and retained in that position either by slipping its end behind a post, $m$, arranged for the purpose, or by a loop attached to the gate, and thrown over the post in the position shown in dotted lines; the fish can then enter, as in other traps, through the open spaces indicated by the arrows, and thence through the mouth $a$ into the pound A; here they are retained until the trap is full, some few possibly escaping by the same channel through which they entered, but not many, because of the peculiar form of the mouth of the trap. Once full the gate is closed, as shown in full lines, Fig. 1, to prevent their escape, and the captured fish then removed in the usual way, or retained there until the fisherman is ready to carry them to market.

When once in the pound and its gate closed it will be obvious that they will not be subject, as formerly, to successful attack by such fish as usually prey upon them, as the wire screen E is abundantly able to protect them against such attacks even from sharks.

Having thus described my invention, what I claim as new, and desire to secure by Letters Patent, is—

1. A protective wire screen or net, E, in connection with the ordinary net-pound A of a fish-trap, both being arranged with relation to each other in the manner and for the purpose specified.

2. The gate $f$, in combination with the mouth $a$ of an ordinary fish-trap, and a protective wire screen or net E, the whole being arranged and operated in the manner and for the purposes specified.

CHAS. E. KETCHAM.

Witnesses:
R. A. HYDE,
D. G. STUART,